United States Patent Office 2,769,849
Patented Nov. 6, 1956

2,769,849

PRODUCTION OF ALKYLCYCLOPARAFFINS

Louis Schmerling, Riverside, Ill., assignor to Universal Oil Products Company, Chicago, Ill., a corporation of Delaware No Drawing. Application October 26, 1950, Serial No. 192,370

8 Claims. (Cl. 260—666)

This application is a continuation-in-part of my copending application Serial No. 673,612, filed May 31, 1946, now abandoned.

This invention relates to the production of alkylcycloparaffins. It is more specifically concerned with the catalytic condensation of ethylene and cycloparaffins.

The polymerization of ethylene has assumed great importance in recent years. For example, Polythene, a thermoplastic polymer of ethylene, is produced on an extensive scale by the polymerization of ethylene at extremely high pressures. Likewise, lubricating oils with high viscosity indices have been manufactured commercially by polymerizing ethylene in the presence of aluminum chloride. In general the processes heretofore used have been characterized by low yields, by high pressures, and, frequently, by high catalyst consumption. I have discovered a method of producing valuable products containing a plurality of ethylene radicals by a process in which these disadvantages have been largely overcome. My process employs relatively low pressure and produces high yields of product per unit weight of catalyst. Although my products are produced primarily by the condensation of ethylene, they also contain a cycloparaffin ring in each molecule, which imparts unusual and valuable properties thereto.

In a broad aspect my invention relates to the reaction of ethylene in the presence of an organic peroxide and a cycloparaffin.

In one embodiment my invention relates to a process for producing alkylcycloparaffins which comprises subjecting ethylene to the action of an organic peroxide condensation catalyst at condensation conditions in the presence of a diluent comprising a cycloparaffin.

In a more specific embodiment my invention relates to a process for producing alkylcycloparaffins which comprises subjecting ethylene to the action of an organic peroxide condensation catalyst at a pressure above about 15 atmospheres, a temperature at least as high as the initial decomposition temperature of said catalyst, and in the presence of a diluent comprising a cycloparaffin containing at least five carbon atoms in the ring.

I have found that when ethlyene is contacted with an organic peroxide in the presence of a diluent comprising a naphthene or cycloparaffin, particularly one containing five or more carbon atoms in the ring, under the conditions herein specified, that such diluent is not inert but actually enters into the reaction as evidenced by the fact that the polymer product contains one molecule of cycloparaffin in each molecule of the polymer. The manner in which the reaction takes place is believed to be as follows:

(1) 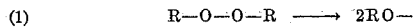

(2) 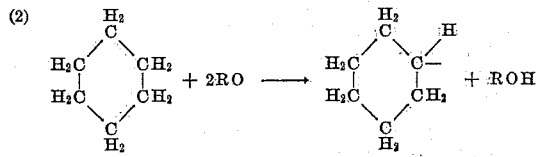

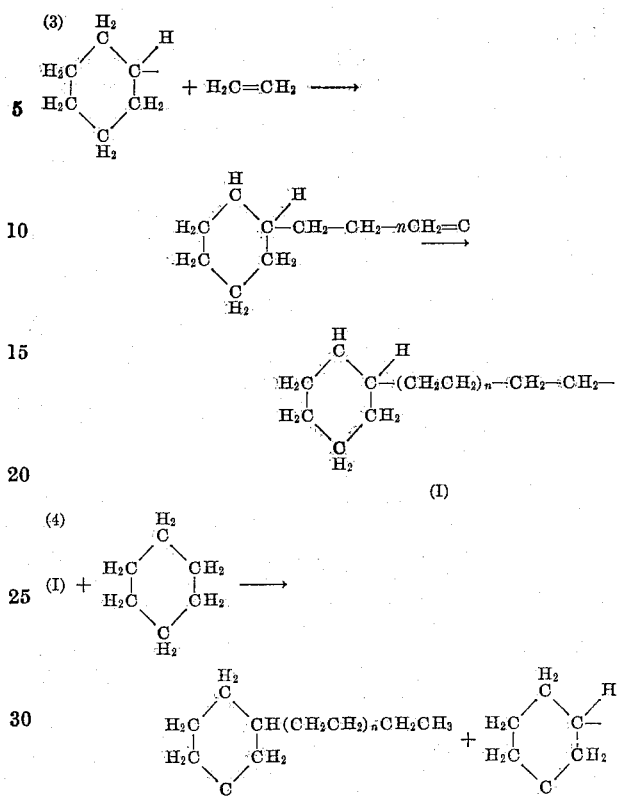

The cyclohexyl radical formed in step 4 starts a new cycle as in step 3. That the solvent or diluent does react was proved by both analysis of lower molecular weight condensation products as well as by showing that the diluent is actually consumed during the course of the reaction.

The reacting of the cycloparaffin diluent in the manner shown appears to be the reason why the products produced by the present process are liquids or grease-like polymers in contradistinction to the waxes or hard solid polymers produced by the prior art processes. The grease-like, semi-solid polymers produced in my process are particularly useful in electrical applications because of their high di-electric strength and because, unlike the hard, solid ethylene polymers produced in the prior art processes, they do not crack when subjected to rapid fluctuations in temperatures. The products produced in my process are also valuable as pour point depressants and viscosity index improvers for lubricating oils. The ethylene polymers heretofore produced, even those employing a paraffin as a diluent, do not act as pour point depressants or viscosity index improvers. In addition, the alkylcycloparaffins that I produce may be dehydrogenated to alkyl aromatics which are easily convertible to surface active agents by sulfonation and neutralization, and the like.

The diluent used in the present process comprises a naphthene or a cycloparaffin and preferably those containing at least five carbon atoms in the ring. Naphthenes or cycloparaffins containing less than five carbon atoms in the ring possess less stability and frequently undergo ring splitting during the course of the reaction. Preferred cycloparaffins comprise cyclohexanes such as cyclohexane and alkylcyclohexanes including methylcyclohexane; and cyclopentanes including particularly alkylcyclopentanes such as methylcyclopentane. Other types of cycloparaffins that may be used as diluents in my process include decahydronaphthalene and bicyclo (2.2.1) heptane. Products of somewhat different characteristics may be obtained by employing cycloparaffin diluents containing one or two halogen atoms attached to the ring; preferably the halogen atoms comprise chlorine or fluorine.

I am aware that certain substances, such as benzene, toluene, and methanol have been suggested as solvents for this reaction. However, the use of cycloparaffins, as hereinbefore stated, results in the production of alkylcycloparaffins having relatively long side chains and, in addition, gives unexpectedly better yields than the compounds suggested and makes possible the polymerization or condensation of ethylene at lower temperatures and pressures than usually are possible with the aromatic or alcoholic solvents.

The catalysts that may be used in the present process comprise organic peroxides that catalyze the polymerization or condensation of ethylene. These substances include peracetic acid, diacetyl peroxide, toluic acid peroxide, oleic peroxide, benzoyl peroxide, tertiary butyl perbenzoate, di-tertiary butyl peroxide, hexyl peroxide, and methylcyclohexyl hydroperoxide.

The process of my invention may be carried out in batch operation by placing a quantity of the cycloparaffinic diluent and the catalyst in a reactor equipped with a mixing device, adding the ethylene, heating to a reaction temperature while mixing the contents of the reactor, cooling after a suitable period of time, and recovering the polymer or condensation product.

The preferred method of operation is of the continuous type. In this method of operation the ethylene, diluent, and catalysts are continuously charged to a reactor maintained under suitable conditions of temperature and pressure. The reactor may be an unpacked vessel or it may contain an adsorbent packing material, such as fire brick, alumina, dehydrated bauxite, and the like, upon which the catalyst is deposited and retained. The polymer is separated from the reactor effluent. The diluent and unconverted ethylene may be recycled to the reaction zone. The reaction temperature can be controlled to an appreciable degree by adjusting the amount of diluent charged to the process, since the diluent absorbs the heat liberated during the reaction and thus prevents excessive temperature rises.

Another mode of operation that may be used is the fluidized type wherein the charge is passed upwardly through a bed of finely divided adsorbent material, thereby causing the particles to become motionalized and forming a fluidlike mass. A portion of the adsorbent may be continuously withdrawn from the reaction zone, cooled, and returned thereto; thus providing an efficient method of removing the heat of reaction.

Instead of separately adding the peroxide catalyst to the reaction zone, I have found that it frequently is more desirable and economical to form the catalyst in situ in the diluent and then charge the resulting solution to the reaction zone together with the ethylene. Formation of the peroxide in the cycloparaffin diluent may be accomplished by auto-oxidation, i. e., by heating the hydrocarbon while air is bubbled through it, preferably in the presence of a trace of peroxide formed in a previous auto-oxidation. Alternatively, the air may be passed through the hydrocarbon in the presence of an oxidation catalyst such as manganese stearate. In some cases it will be beneficial to add a minor amount of olefinic or cycloolefinic hydrocarbon to the cycloparaffin before passing air through it.

In the continuous methods of carrying out my process, the catalyst preferably is added continuously to the reaction zone, but, if desired, it may be added intermittently, particularly when a packing material which retains catalyst is employed in the reactor.

The temperature employed in the process of this invention should be at least as high as the initial decomposition temperature of the peroxide used as the catalyst. In the case of tertiary butyl perbenzoate, for example, the decomposition temperature is approximately 115° C. Higher temperatures may be employed but little advantage is gained if the temperature is more than about 150° C. higher than the decomposition temperature of the catalyst. The general effect of increasing the temperature is to accelerate the rate of reaction, but the increased reaction rate is accompanied by a decrease in the molecular weight of the polymer. Thus by choosing a temperature within the indicated range, as well as by varying the proportion of ethylene to cycloparaffin, polymers varying from semi-solids to liquids may be obtained.

In contrast to many of the prior art processes that dealt with ethylene polymerization, pressures as low as 15 atmospheres may be employed with good results in my process. Pressures as high as 500 atmospheres may be used, but the preferred range is from about 30 to about 100 atmospheres. In general, the molecular weight of my condensation product or polymer increases with increasing pressure.

The concentration of catalyst utilizable in my process can vary over a wide range. For reasons of economy, it generally is desirable to use low concentrations of catalysts such as from about 0.1% to about 4% of the ethylene charge. Higher concentrations of catalyst result in lower molecular weight products and if such products are desired they may be prepared by using catalyst concentrations up to 15% or more.

In batch operations and in flow operations that do not employ packing materials, the contact time should be in the range of from about 3 minutes to about 6 hours. However, contact times of at least 10 minutes usually are preferred. In fixed bed operations the space velocity, defined as the volume of liquid charged per hour divided by the superficial volume of the packing, should be in the range of about 0.1 to about 10.

The ratio of cycloparaffin diluent to ethylene charged to the reaction zone may vary over a relatively wide range. In general, the conversion of ethylene to polymer increases, but at a decreasing rate, as the weight ratio of diluent to ethylene is increased, and the average molecular weight of the product increases. A 1:1 ratio is satisfactory, but economic, operating, and product quality considerations may dictate the use of higher or lower ratios.

The following examples are given to illustrate my invention but they are not introduced with the intention of unduly limiting the generally broad scope of said invention. The experiments given under the examples were carried out by heating the reactants in a glass liner in a rotating autoclave for four hours. Unless otherwise noted, the charge was 3 grams of peroxide, 50 grams of diluent, and 40 atmospheres of initial ethylene pressure, which is equivalent to approximately 40 grams of ethylene.

EXAMPLE I

Effect of impurities

The data given below were obtained in experiments conducted at 115° C. using tertiary butyl perbenzoate as a catalyst.

| Experiment No | 1 | 2 | 3 | 4 |
|---|---|---|---|---|
| Diluent | None | Methylcyclohexane | Methanol | Toluene |
| Product: | | | | |
| Weight, g | 0 | 29 | 7 | 6. |
| Consistency | | Greaselike | Hard Solid | Viscous Oil. |
| Melting Point, °C.[1] | | 80 | 85 | |

[1] ASTM Test Method D127-30.

It can be seen that under these conditions of operation, no polymer was obtained in the absence of a diluent or solvent. Also, it should be noted that substantially greater yields of a product with different characteristics were obtained when using methylcyclohexane as compared to the results obtained with the alcohol and aromatic solvent.

EXAMPLE II

Effect of ethylene concentration

Different concentrations of ethylene were obtained in the experiments shown below, by following different procedures in charging the autoclave. In Experiment 2, ethylene was passed into the autoclave, containing the diluent, to a pressure of 40 atmospheres. Thereafter, the autoclave was rotated at room temperature for 15 minutes, during which time the pressure decreased. Ethylene was again added to the autoclave to once more bring the pressure up to 40 atmospheres. In Experiment 5, the autoclave was charged to a pressure of 40 atmospheres, with no subsequent rotating of the autoclave or recharging with ethylene. Thus, although the initial pressure in each case was 40 atmospheres, there was considerably more ethylene in the autoclave in Experiment 2, due to solution in the diluent, than there was in Experiment 5. This is shown by the maximum pressures obtained in the two experiments and by a comparison of the yields.

| Expt. No. | 2 | 5 |
|---|---|---|
| Diluent | $MeC_6H_{11}$ | $MeC_6H_{11}$ |
| Reactants, g.: | | |
| Diluent | 50 | 50. |
| t-Butyl Perbenzoate | 3 | 3. |
| Ethylene | (¹) | (¹) |
| Pressure: | | |
| Initial, $C_2H_4$ | 40 | 40. |
| Maximum at T | 68 | 52. |
| Minimum at T | | 47. |
| Final, r. t. | | 22. |
| Temperature, T, °C.² | 115 | 115. |
| Duration, Hrs | | 4. |
| Polymer | 29 | 13.0. |
| Consistency of Polymer | Greaselike | Liquid. |

¹ Ethylene charged to pressure shown.
² Autoclave heated from 110–115°C. during four hours The foregoing data show that it is possible to alter the character of the product by changing the ratio of ethylene to diluent.

EXAMPLE III

Effect of temperature

The following data show the effect of temperature upon the yield and quality of the polymer on condensation product. In each of the experiments the diluent was methylcyclohexane.

| Experiment No. | 6 | 7 | 8 | 9 | 10 |
|---|---|---|---|---|---|
| Temperature °C. | 75 | 115 | 200 | 130 | 200 |
| Catalyst | Tertiary Butyl Perbenzoate | | | Di-Tertiary Butyl Peroxide | |
| Product: | | | | | |
| Weight, g. | 0 | 29 | 16 | 46 | 18. |
| Consistency | | Greaselike. | Liquid. | Greaselike. | Liquid. |

It can be seen that increasing the temperature decreased the yield and melting point of the polymer and that no product was obtained when the reaction temperature was lower than the decomposition temperature of the catalyst. The liquid polymers produced in the two experiments were unsaturated and had bromine numbers of 10.

EXAMPLE IV

Effect of impurities

Two experiments were conducted in which a 50/50 mixture of ethane and ethylene, initial pressure equal 40 atmospheres, was contacted with 3 g. of tertiary butyl perbenzoate. In the first experiment, no cycloparaffin diluent was present; whereas in the second, 50 g. of methylcyclohexane was present. In the first experiment only 4 g. of polymer was obtained; whereas in the second, 18 g. was obtained.

From the foregoing data it can be seen that by the use of my invention long chain alkylcycloparaffins can be produced from ethylene and cycloparaffins at relatively mild operating conditions and with low consumptions of catalyst. It can further be seen that a variety of products can be made and that these products possess valuable and useful characteristics.

I claim as my invention:

1. A process for producing alkylcycloparaffins which comprises forming a mixture consisting of ethylene, a cycloparaffin and an organic peroxide catalyst, reacting the ethylene with the cycloparaffin by heating said mixture at a pressure above about 15 atmospheres to a temperature at least as high as the initial decomposition temperature of said catalyst, and recovering the resultant ethylene-cycloparaffin reaction product.

2. The process of claim 1 further characterized in that said cycloparaffin comprises a cyclohexane.

3. The process of claim 1 further characterized in that said cycloparaffin comprises an alkylcyclohexane.

4. The process of claim 1 further characterized in that said cycloparaffin comprises methylcyclohexane.

5. The process of claim 1 further characterized in that said cycloparaffin comprises a cyclopentane.

6. The process of claim 1 further characterized in that said cycloparaffin comprises an alkylcyclopentane.

7. The process of claim 1 further characterized in that said cycloparaffin comprises methylcyclopentane.

8. The process of claim 1 further characterized in that said cycloparaffin comprises decahydronaphthalene.

References Cited in the file of this patent

UNITED STATES PATENTS

| 2,402,137 | Hanford, et al. | June 18, 1946 |
| 2,450,451 | Schmerling | Oct. 5, 1948 |
| 2,482,877 | Schmerling | Sept. 27, 1949 |